(12) United States Patent
Lin

(10) Patent No.: US 6,290,246 B1
(45) Date of Patent: Sep. 18, 2001

(54) QUICK MOUNTING ARRANGEMENT FOR TANDEM

(76) Inventor: Bor-Ching Lin, No. 24, Shuang Ho St., Yung Ho, Taipei Hsien (TW)

( * ) Notice: Subject to any disclaimer, the term of this patent is extended or adjusted under 35 U.S.C. 154(b) by 0 days.

(21) Appl. No.: 09/686,936

(22) Filed: Oct. 12, 2000

(51) Int. Cl.⁷ .............................. B62K 13/02; B62K 27/12
(52) U.S. Cl. ........................... 280/204; 280/239; 280/292
(58) Field of Search .................................. 280/204, 231, 280/239, 292, 30, 281.1, 282

(56) References Cited

U.S. PATENT DOCUMENTS

| | | | |
|---|---|---|---|
| 579,982 | * | 4/1897 | Jakobson . |
| 598,872 | * | 2/1898 | Hunt . |
| 658,406 | * | 9/1900 | Straub . |
| 1,300,343 | * | 4/1919 | Carswell . |
| 2,271,255 | * | 1/1942 | Du Bois . |
| 3,993,320 | * | 11/1976 | Robinson ............................. 280/204 |
| 4,458,908 | * | 7/1984 | Strong ................................. 280/239 |
| 5,372,371 | * | 12/1994 | Larson ................................ 280/7.16 |
| 5,860,662 | * | 1/1999 | Bartoshesky et al. ............... 280/204 |

\* cited by examiner

*Primary Examiner*—Anne Marie Boehler
(74) *Attorney, Agent, or Firm*—Bacon & Thomas PLLC

(57) ABSTRACT

A quick-mounting arrangement for connecting a first bicycle to a second bicycle. The arrangement includes a pivot holder which is integrally formed with a rear fork of the first bicycle. The arrangement includes a quick-release mechanism which is adapted to secure a front fork of the second bicycle to the pivot holder to form a tandem upon the removal of a front wheel of the second bicycle. The pivot holder includes two parallel lugs. Each of the lugs includes a pivot hole adapted to receive the quick-release mechanism to enable the quick-release mechanism to secure the front fork of the second bicycle to the pivot holder.

3 Claims, 4 Drawing Sheets

QUICK MOUNTING ARRANGEMENT FOR TANDEM

BACKGROUND OF THE INVENTION

1. Field of the Invention

The present invention relates to tandems and, more specifically, to a quick mounting arrangement for tandem, which enables two bicycles to be quickly and detachably connected together to form a tandem.

2. Description of the Related Art Riding bicycles is a favorite sport. A variety of bicycles and tandems are commercially available for recreational activities. A regular tandem has two or more seats for multiple riders. However, because regular tandems are not detachable, they occupy excessive storage space. It is inconvenient to deliver a tandem from place to place, or to keep a tandem at home. Due to these drawbacks, few people would buy a tandem.

SUMMARY OF THE INVENTION

The present invention has been accomplished under the circumstances in view. It is one object of the present invention to provide a quick mounting arrangement for tandem, which enables two bicycles to be quickly connected together to form a tandem. It is another object of the present invention to provide a quick mounting arrangement for tandem, which uses a quick-release mechanism to secure two bicycles together to form a tandem, enabling the two bicycles to be quickly detached from each other according to one aspect of the present invention, the quick mounting arrangement for tandem comprises a pivot holder formed integral with the rear fork of a first bicycle, and a quick-release mechanism installed in the pivot holder to detachably secure the front fork of a second bicycle to the first bicycle after removal of the front wheel of the second bicycle. According to another aspect of the present invention, a retractable link mechanism is coupled between the seat tube of the first bicycle and the head tube of the second bicycle to keep the bicycles positively linked.

DETAILED DESCRIPTION OF THE PREFERRED EMBODIMENT

Figure 1:
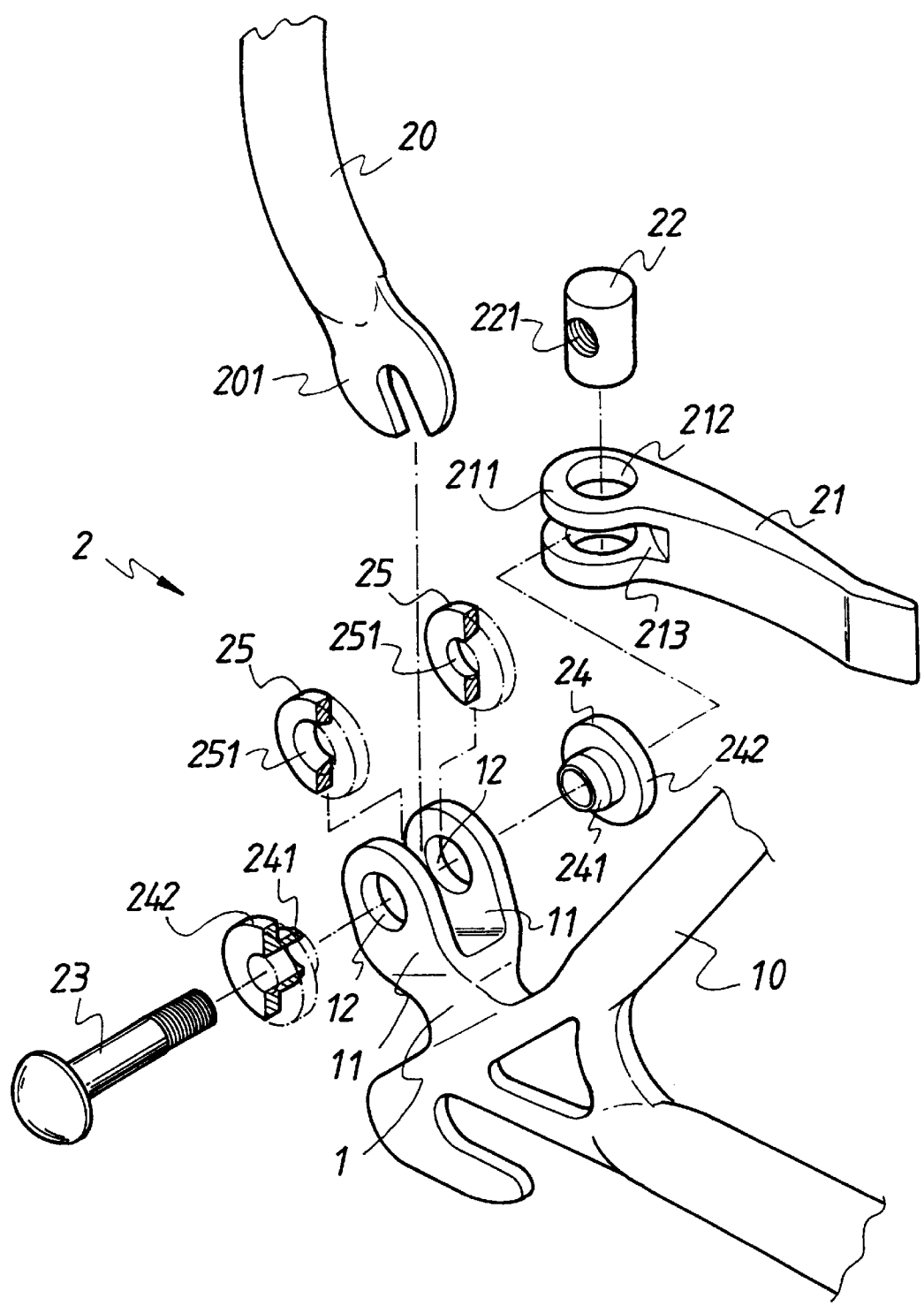
FIG. 1 is an exploded view of a quick mounting arrangement for tandem according to the present invention.

Referring to FIG. 1, a quick mounting arrangement for tandem in accordance with the present invention is generally comprised of a pivot holder 1, and a quick-release mechanism 2. The pivot holder 1 is formed integral with an upper part of the rear end of the rear fork 10 of a bicycle, namely, the first bicycle, comprising two upwardly extended parallel lugs 11, each lug 11 having a pivot hole 12. The quick-release mechanism 2 is comprised of a lever 21, a nut 22, a screw bolt 23, two axle bushes 24, and two packing rings 25. The lever 21 comprises two parallel eyelets 211 forwardly extended from one end thereof and spaced by a gap 213, each eyelet 211 defining a center through hole 212. The nut 22 is a cylindrical rod having a screw hole 221 on the periphery. The axle bushes 24 are shaped like a stepped socket, each comprising a tapered front portion 241 and a rear shoulder portion 242. The packing rings 25 each have a tapered center through hole 251.

Figure 2:
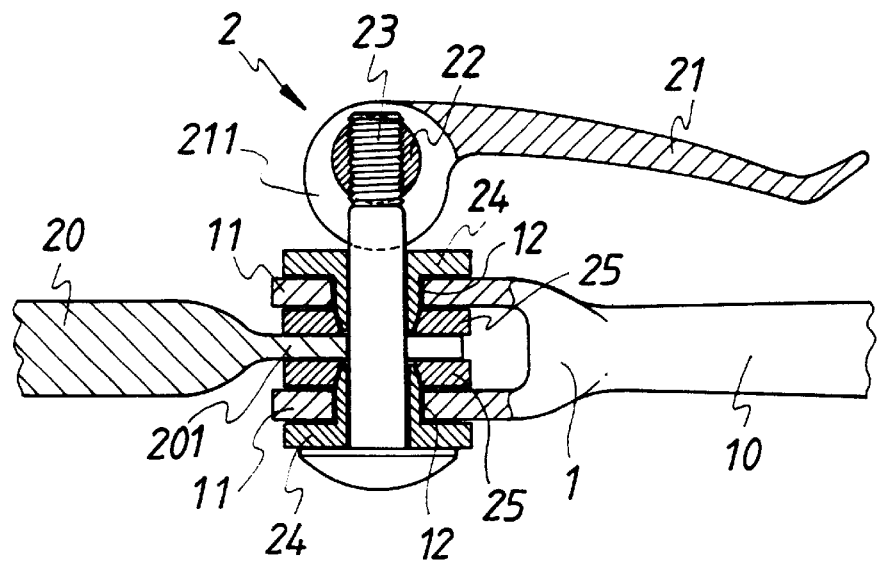
FIG. 2 is a sectional assembly view of the quick mounting arrangement for tandem shown in FIG. 1.

Referring to FIG. 2 and FIG. 1 again, the axle bushes 24 and the packing rings 25 are respectively attached to the lugs 11 of the pivot holder 1 at two opposite sides, enabling the tapered front portion 241 of each axle bush 24 to be respectively engaged into the tapered center through hole 251 of each packing ring 25 and the rear shoulder portion 242 of each axle bush 24 to be respectively stopped outside the lugs 11 of the pivot holder 1, and then the nut 22 is inserted into the center through hole 212 of each eyelet 211 of the lever 21, and then the screw bolt 23 is inserted through the axle bushes 24 and the packing rings 25 and threaded into the screw hole 221 of the nut 22, enabling the lever 21 to be turned about the nut 22 at one side of the pivot holder 1 between the locking position and the unlocking position.

Figure 4:
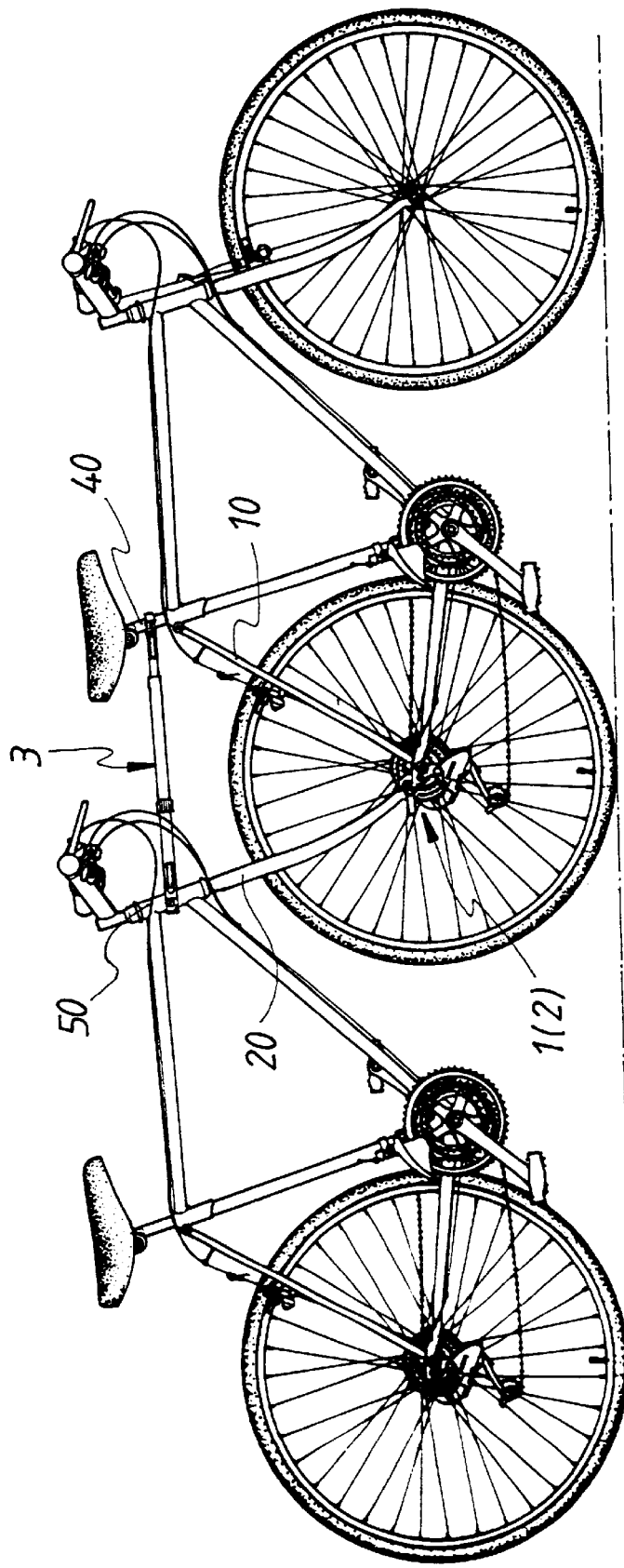
FIG. 4 illustrates a tandem constructed according to the present invention.

Referring to FIG. 4 and FIGS. from 1 through 3 again, the front wheel of a second bicycle is removed, and then the forked front end 201 of the front fork 20 of the second bicycle is inserted in between the packing rings 25 and forced into engagement with the periphery of the screw bolt 23, and then the lever 21 is turned about the nut 22 from the unlocking position to the locking position to force the axle bushes 24 toward each other, and therefore the packing rings 25 are squeezed against the forked front end 201 of the front fork 20 of the second bicycle to secure the second bicycle to the first bicycle.

By means of providing the rear fork of a first bicycle with a pivot holder, a second bicycle, after removal of its front wheel, can quickly and detachably be fastened to the first bicycle with a quick-release mechanism to form a tandem. When the tandem runs over an uneven road surface, the front fork 20 of the second bicycle can still be vibrated slightly relative to the rear fork 10 of the first to buffer the pressure.

Figure 3:
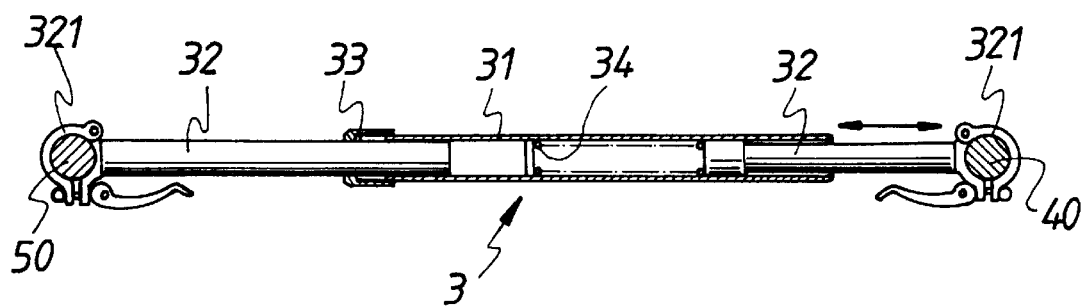
FIG. 3 is a sectional view of an auxiliary link structure according to the present invention.

Referring to FIG. 3, an auxiliary link structure 3 may be used and coupled between the first bicycle and the second bicycle. The auxiliary link structure 3 is comprised of a tube 31, two links 32, a locknut 33, and a compression spring 34. The tube 31 is a round tube having two open ends in communication with each other. The links 32 are round rods respectively inserted into the two distal ends of the tube 31, each having one end terminating a clamping ring 321. The locknut 33 is mounted on one end of the tube 31 and fastened up to lock one link 32. The compression spring 34 is mounted inside the tube 31, and connected between the links 32.

Figure 5:
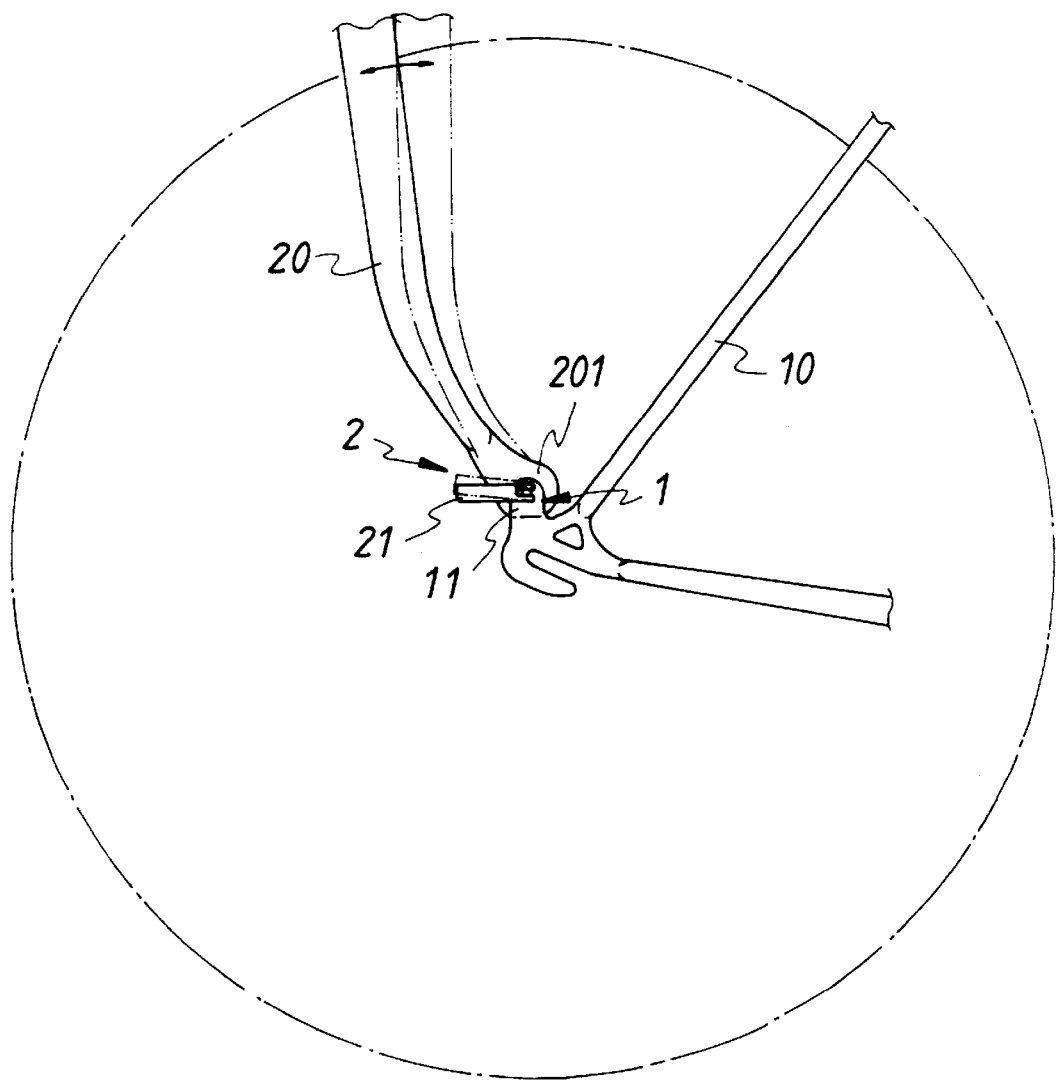
FIG. 5 is a schematic drawing showing the front fork of the second bicycle vibrated relative to the rear fork of the first bicycle.

Referring to FIGS. 4 and 5, the clamping rings 321 of the links 32 are respectively fastened to the seat tube 40 of the first bicycle and the head tube 50 of the rear bicycle. Because the front-sided link 32 is supported on the compression spring 34 and slidably inserted into the tube 31, the length of the auxiliary link structure 3 is automatically adjusted during running of the tandem.

It is to be understood that the drawings are designed for purposes of illustration only, and are not intended for use as a definition of the limits and scope of the invention disclosed.

What the invention claimed is:

1. A quick mounting arrangement comprising:
   a pivot holder formed integrally with a rear fork of a first bicycle;

a quick-release mechanism adapted to secure a front fork of a second bicycle to said pivot holder to form a tandem after removal of the front wheel of said second bicycle;

said pivot holder comprising two parallel lugs, said lugs each having a pivot hole adapted to receive said quick-release mechanism for enabling said quick-release mechanism to secure the front fork of said second bicycle to said pivot holder;

said quick-release mechanism comprises a screw bolt inserted through the pivot hole of each lug of said pivot holder;

two packing rings respectively mounted on said screw bolt and bilaterally retained between the lugs of said pivot holder and two opposite sides of the front fork of said second bicycle, said packing rings each having a tapered center through hole for passing said screw bolt, two axle bushes respectively mounted on said screw bolt and engaged in the pivot hole of each lug of said pivot holder, said axle bushes each having a tapered front end inserted through the pivot hole of one of the lugs of said pivot holder and engaged into the tapered center through hole of one packing ring and a rear shoulder portion stopped at an outer side wall of one lug of said pivot holder; and a lever comprising two parallel eyelets at one end thereof, and a nut mounted in the eyelets of said lever and threaded onto said screw bolt for enabling said lever to be turned about said nut between a first position where said axle bushes are pushed toward each other to force said packing rings against the front fork of said second bicycle at two opposite sides and to secure the front fork of said second bicycle to said pivot holder, and a second position where said axle bushes are released from the pressure for enabling the front fork of said second bicycle to be disconnected from said pivot holder.

2. A quick mounting arrangement comprising:

a pivot holder formed integrally with a rear fork of a first bicycle;

a quick-release mechanism adapted to secure a front fork of a second bicycle to said pivot holder to form a tandem after removal of the front wheel of said second bicycle;

said pivot holder comprising two parallel lugs, said lugs each having a pivot hole adapted to receive said quick-release mechanism for enabling said quick-release mechanism to secure the front fork of said second bicycle to said pivot holder;

an auxiliary link structure coupled between said first bicycle and said second bicycle; and said auxiliary link structure comprises a round tube having a first end and a second end, a first link, said first link having a first end inserted into the first end of said round tube and a second end terminating in a clamping ring fastened to the seat tube of said first bicycle, a second link having a first end inserted into the second end of said round tube and a second end terminating in a clamping ring fastened to a head tube of said second bicycle, and a locknut mounted on the second end of said round tube to lock said round tube and said second link.

3. A quick mounting arrangement comprising:

a pivot holder formed integrally with a rear fork of a first bicycle;

a quick-release mechanism adapted to secure a front fork of a second bicycle to said pivot holder to form a tandem after removal of the front wheel of said second bicycle;

said pivot holder comprising two parallel lugs, said lugs each having a pivot hole adapted to receive said quick-release mechanism for enabling said quick-release mechanism to secure the front fork of said second bicycle to said pivot holder; and said quick-release mechanism comprises a screw bolt inserted through the pivot hole of each lug of said pivot holder, two packing rings respectively mounted on said screw bolt and bilaterally retained between the lugs of said pivot holder and two opposite sides of the front fork of said second bicycle, said packing rings each having a tapered center through hole for the passing of said screw bolt, two axle bushes respectively mounted on said screw bolt and engaged in the pivot hole of each lug of said pivot holder, said axle bushes each having a tapered front end inserted through the pivot hole of one lug of said pivot holder and engaged into the tapered center through hole of one packing ring and a rear shoulder portion stopped at an outer side wall of one lug of said pivot holder, and a quick-release nut fastened to said screw bolt and turned between a first position where said axle bushes are pushed toward each other to force said packing rings against the front fork of said second bicycle at two opposite sides and to secure the front fork of said second bicycle to said pivot holder, and a second position where said axle bushes are released from the pressure for enabling the front fork of said second bicycle to be disconnected from said pivot holder.

* * * * *